United States Patent
Brem et al.

(10) Patent No.: US 12,405,350 B2
(45) Date of Patent: Sep. 2, 2025

(54) VEHICLE COMPONENT FOR INTEGRATING AN ENVIRONMENT DETECTION SENSOR INTO A VEHICLE

(71) Applicant: Bayerische Motoren Werke Aktiengesellschaft, Munich (DE)

(72) Inventors: Erich Brem, Mering (DE); Markus Dix, Landshut (DE); Mirko Ginovski, Augsburg (DE); Franz Maidl, Eichendorf (DE); Rudolf Schilling, Ergolding (DE); Bernd Veihelmann, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 879 days.

(21) Appl. No.: 17/633,658

(22) PCT Filed: Sep. 8, 2020

(86) PCT No.: PCT/EP2020/075027
§ 371 (c)(1),
(2) Date: Feb. 8, 2022

(87) PCT Pub. No.: WO2021/073806
PCT Pub. Date: Apr. 22, 2021

(65) Prior Publication Data
US 2022/0317306 A1 Oct. 6, 2022

(30) Foreign Application Priority Data
Oct. 17, 2019 (DE) .................... 10 2019 128 013.3

(51) Int. Cl.
*G01S 7/02* (2006.01)
*G01S 13/931* (2020.01)
*G01S 17/931* (2020.01)

(52) U.S. Cl.
CPC ..... *G01S 7/027* (2021.05); *G01S 2013/93275* (2020.01); *G01S 17/931* (2020.01)

(58) Field of Classification Search
CPC ............. B60R 11/04; B60R 2011/0045; B60R 2011/0043; B60Q 1/2653; B60Q 1/2619; G01S 7/027; G01S 7/4813; G01D 11/245
(Continued)

(56) References Cited

U.S. PATENT DOCUMENTS 8,149,157 B2 * 4/2012 Takeuchi ............. H01Q 1/3233
343/872
10,144,424 B2 * 12/2018 Hara ..................... G01S 13/931
(Continued)

FOREIGN PATENT DOCUMENTS

CN 103963588 A 8/2014
CN 106043144 A 10/2016
(Continued)

OTHER PUBLICATIONS

Machine Tranlsation of DE-102016217057-A1, Mar. 14, 2025.*
(Continued)

*Primary Examiner* — Jason S Morrow
(74) *Attorney, Agent, or Firm* — Crowell & Moring LLP

(57) ABSTRACT

A vehicle component integrates an environment detection sensor into a vehicle. The vehicle component is in the form of a plastic component and has a main body with a recess for receiving the environment detection sensor. Towards a visible side of the vehicle component, the recess is delimited by a cover portion which has a signal passage surface or a signal passage opening.

13 Claims, 1 Drawing Sheet

(58) Field of Classification Search
USPC .......................................................... 296/210
See application file for complete search history.

(56) References Cited

U.S. PATENT DOCUMENTS

| | | | | |
|---|---|---|---|---|
| 10,488,494 | B2* | 11/2019 | Nichols | G01S 17/931 |
| 11,046,255 | B2* | 6/2021 | Miwa | B60R 19/483 |
| 11,820,297 | B2* | 11/2023 | Li | F16M 13/02 |
| 12,065,025 | B2* | 8/2024 | Nagai | B60R 1/001 |
| 12,172,503 | B2* | 12/2024 | Huelsen | B60Q 1/2611 |
| 2006/0284515 | A1* | 12/2006 | Nakajima | B60R 19/483 310/311 |
| 2012/0200121 | A1* | 8/2012 | Wuerfel | B60R 19/483 296/193.09 |
| 2014/0210177 | A1 | 7/2014 | Dicke et al. | |
| 2016/0282155 | A1* | 9/2016 | Hara | G01S 7/4813 |
| 2016/0297437 | A1 | 10/2016 | Hara et al. | |
| 2018/0284233 | A1 | 10/2018 | Nichols et al. | |
| 2019/0071050 | A1 | 3/2019 | Farooq et al. | |
| 2019/0204426 | A1 | 7/2019 | Vaishnav et al. | |
| 2019/0263452 | A1 | 8/2019 | Hogger et al. | |
| 2019/0267705 | A1 | 8/2019 | Klar et al. | |
| 2020/0094498 | A1 | 3/2020 | Lobo Casanova | |
| 2021/0148737 | A1* | 5/2021 | Yamaji | G01S 7/4813 |
| 2023/0038114 | A1* | 2/2023 | Davis | B32B 27/36 |
| 2023/0319381 | A1* | 10/2023 | Meyer | H04N 23/54 348/148 |
| 2023/0365069 | A1* | 11/2023 | Maeda | B60R 16/03 |
| 2023/0399057 | A1* | 12/2023 | Sviberg | B62D 27/023 |
| 2024/0201332 | A1* | 6/2024 | Robertson, Jr. | G01S 13/865 |
| 2024/0308434 | A1* | 9/2024 | Schieder | B60R 11/00 |
| 2024/0416846 | A1* | 12/2024 | Sviberg | B60R 11/04 |

FOREIGN PATENT DOCUMENTS

| | | | | |
|---|---|---|---|---|
| CN | 109789746 | A | 5/2019 | |
| CN | 109991671 | A | 7/2019 | |
| CN | 112193209 | A * | 1/2021 | ............ B60S 1/0411 |
| DE | 103 47 098 | A1 | 5/2005 | |
| DE | 10 2007 057 259 | A1 | 5/2009 | |
| DE | 20 2011 052 507 | U1 | 5/2013 | |
| DE | 10 2016 104 871 | A1 | 9/2016 | |
| DE | 102016217057 | A1 * | 3/2018 | ........... B60Q 1/0023 |
| DE | 10 2017 200 368 | A1 | 7/2018 | |
| DE | 20 2017 006 640 | U1 | 5/2019 | |
| DE | 102019120847 | A1 * | 2/2021 | |
| EP | 3 258 289 | A1 | 12/2017 | |

OTHER PUBLICATIONS

Machine Tranlsation of CN-112193209-A, Mar. 14, 2025.*
Machine Tranlsation of DE-102019120847-A1, Mar. 14, 2025.*
Machine Tranlsation of EP3258289-A1, Mar. 14, 2025.*
International Search Report (PCT/ISA/210) issued in PCT Application No. PCT/EP2020/075027 dated Oct. 26, 2020 with English translation (five (5) pages).
German-language Written Opinion (PCT/ISA/237) issued in PCT Application No. PCT/EP2020/075027 dated Oct. 26, 2020 (five (5) pages).
German-language Search Report issued in German Application No. 10 2019 128 013.3 dated Aug. 3, 2020 with partial English translation (11 pages).
Chinese-language Office Action issued in Chinese Application No. 202080058073.X dated Aug. 27, 2024 with English translation (20 pages).
Chinese-language Office Action issued in Chinese Application No. 202080058073.X dated Apr. 10, 2025 with English translation (16 pages).

* cited by examiner

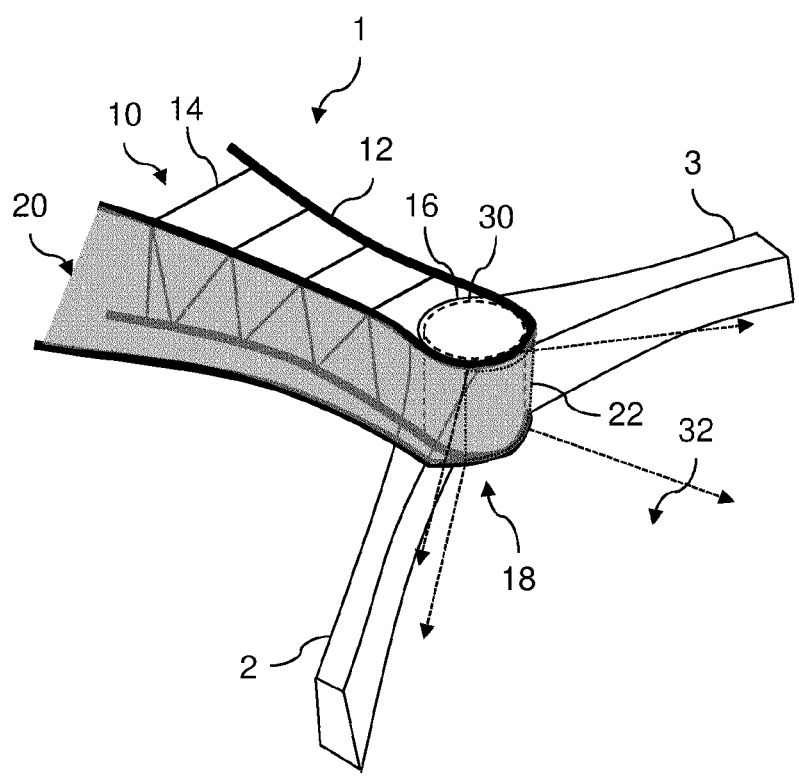

VEHICLE COMPONENT FOR INTEGRATING AN ENVIRONMENT DETECTION SENSOR INTO A VEHICLE

BACKGROUND AND SUMMARY OF THE INVENTION

The invention relates to a vehicle component for integrating an environment detection sensor into a vehicle.

To make fully automated or autonomous driving possible, a multitude of environmental data is required. These data are provided by environment detection sensors on the vehicle and are further processed and evaluated in control devices. Lidar or radar sensors and cameras are used for example as environment detection sensors. In particular, lidar technology offers detection of a surrounding area with a great range and in combination with a wide coverage.

The required sensors must be fitted at various points of the vehicle, including in the roof area. In vehicle studies, lidar sensors have so far been placed on the vehicle roof. There, however, they form a disturbing visual and aerodynamic contour. Furthermore, it is known to integrate lidars in the area of the front bumper of the vehicle. For design reasons, there may be protective devices, which are arranged in front of the lidar and allow the lidar to retreat visually into the background. However, these protective devices disturb the function of the lidar and must be laboriously calibrated.

It is also known from the document DE 10 2016 104 871 A1 to attach an environment information detection sensor to an outer side of the vehicle, on an element of the body having a closed cross-sectional form. The sensor is covered with respect to the outside of the vehicle by a signal-transmissive covering. However, the proposed solution is technically complex in terms of production and the possibilities of integrating the sensor without adapting the outer vehicle contour are limited.

Against this background, the object of the invention is to provide a possible way in which the integration of an environment detection sensor into a motor vehicle can be improved. In particular, the integration is intended to be devised in such a way that the appearance and aerodynamics of the vehicle are influenced as little as possible.

The object is achieved by a vehicle component according to the independent claim. Further advantageous designs are provided by the dependent claims and the following description.

A vehicle component for integrating an environment detection sensor into a vehicle is provided. The vehicle component is formed as a plastic component and has a main body with a recess for receiving the environment detection sensor. The recess is delimited toward a visible side of the component by a covering portion which has a signal passing-through area or a signal passing-through opening.

In other words, a recess which is completely or largely covered from the outside and in which the environment detection sensor can be received is created in the main body. In the covering portion, either a signal passing-through opening is provided, or at least part of the covering portion is designed as a signal passing-through area, i.e. the signals emitted and received by the sensor can pass through the signal passing-through area or the signal passing-through opening. It is therefore possible to detect the environment outside the vehicle component or outside the vehicle by a sensor arranged inside the main body. A high degree of flexibility with regard to the geometrical design of the recess is made possible by the vehicle component being formed as a plastic component. By means of plastics technology, forms which cannot be created with metal components, or only very laboriously, can be realized. By forming the component as a plastic component, it is possible to allow the sensor as it were to "disappear" inside the component, without the integration of the sensor having to result in externally perceptible changes to the component. By relocating the sensor to the interior of the component, the overall appearance and aerodynamics of the vehicle are improved, since the component contour can be designed to meet the visual or aerodynamic requirements.

The recess in the main body is designed to receive the environment detection sensor. The recess may be designed for example as a depression in the main body or as a through-opening in the main body. The recess may be adapted to the form of the sensor and receive it for example—at least partially—in a form-fitting manner. The recess is preferably formed so as to be of such a size that the environment detection sensor can be received completely in the recess. In particular, it may be provided that a fitted environment detection sensor finishes flush with an outer contour of the main body or is set back from it. In this way, the environment detection sensor can be as it were "countersunk" in the component, whereby the shape of the outer contour of the vehicle component remains uninfluenced by the integration of the sensor.

The recess extends up to a visible side of the vehicle component. There it is delimited by the covering portion. The visible side of the component remains visible in the fitted state on the vehicle, is therefore not covered by further components or add-on parts. The visible side of the vehicle component preferably forms part of the outer skin of the vehicle. The covering portion forms at least part of the visible side of the vehicle component.

It is particularly preferred that the covering portion is formed in one piece with the main body. Saying that they are formed in one piece means here that the covering portion and the main body cannot be separated from one another without being damaged. This has the advantage that the sensor can be protected in the recess particularly well from external effects. Moreover, a one-piece form makes it easier for the vehicle component to be mounted on the vehicle.

It is contemplated to form the covering portion and the main body as one part from the same plastics material. In order to be able to make better allowance for the different functions of the covering portion and the main body, and nevertheless provide a reliably sealed receptacle for the sensor, externally protected from dust and moisture, in one design the covering portion is molded onto the main body. Different plastics may be used for the covering portion and the main body.

The covering portion may be at least partially formed as a signal passing-through area. This means that the covering portion is designed in form and choice of material such that, at least in a partial region, it is sufficiently transmissive to the sensor signals. The sensor function can therefore be ensured even though the sensor is arranged in the vehicle component and is externally covered. The covering portion is formed from a plastics material. Polycarbonate (PC) is suitable for example as the plastics material. PC is suitable in particular for the laser radiation used in the case of lidar sensors.

The covering portion may be additionally colored, in order to mask the sensor. This makes it possible for the environment detection sensor to be integrated less obtrusively into the vehicle. The covering portion may also have different material thicknesses, and so the covering portion may have a reduced wall thickness in the region of the signal passing-through area, that is to say a smaller thickness than in the rest of the covering portion. As a result, the transmission through the signal passing-through area can be further improved and the sensor range and quality of the sensor data can be increased.

The main body defines the structural and mechanical properties of the vehicle component. It may be formed from a thermosetting and/or thermoplastic material. The main body may preferably have a fiber reinforcement. This may be arranged only in the partial portions or in the entire main body. The main body of the component may for example consist of a fiber-reinforced plastic. Carbon, glass or aramid fibers may preferably be used as reinforcing fibers. Fiber reinforcement may for example take the form of continuous fibers, which may be formed as a single-layer or multi-layer arrangement of a woven fabric, a braided fabric, a cross-laid structure or the like. The fiber reinforcement in the main body increases the strength and mechanical load-bearing capacity of the vehicle component. By suitable orientation of the reinforcing fibers, it is possible to create a component that meets the requirements for a body component and in particular for a structural component in a motor vehicle and nevertheless to create recesses for the sensor that are sufficiently large and adapted to the form of the sensor.

Particularly great degrees of freedom with respect to the integration of the sensor are obtained if in one design the main body is formed in a skeleton type of construction. In the case of the skeleton type of construction, the stiffness of the components is achieved by way of a fiber-reinforced truss-like structure. This skeleton structure may be closed by way of additional material. The fiber reinforcement may be used appropriately for the load paths and only in the regions in which fiber reinforcement is necessary to achieve the desired component properties. For example, it is known to produce fiber-reinforced bars by the pultrusion process, to shape them into a skeleton and to use the injection-molding process to encapsulate them in a thermoplastic matrix, which then establishes the outer geometry of the component. This fundamental structure of a skeleton component can then be advantageously used within the scope of the invention. Therefore, the main body may in one design have a skeleton structure with multiple fiber-reinforced bars and the recess may be arranged between the bars. For example, the bars may be at least partially led around the recess. The skeleton type of construction makes it possible to provide a recess of almost any desired depth in the component, whereby the integration of even large sensors is made easier or is made possible in the first place. The skeleton type of construction also makes a great degree of freedom possible with regard to the positioning of the recess in the vehicle component.

The vehicle component may be in particular a body component and preferably a structural component of a motor vehicle. For example, it may be a roof frame, a vehicle pillar (A, B, C, D pillar), a rear window frame, a roof or the like.

In a further design, the vehicle component may be a node element in a vehicle body. Such nodes can be found for example at the transition of the roof frame to the A pillar or at the rear end of the roof at the transition of the roof frame to the C or D pillar. Such corner positions offer advantages for the integration of the environment information sensor, since they are arranged very high on the vehicle and consequently allow a good range and "view" of the other vehicles. Furthermore, the angular range that can be covered by the sensor is very great and may be for example approximately 270 degrees.

It is advantageous if the environment detection sensor is only mounted in the vehicle component at a later point in time, for example after the vehicle body has been completed and painted. In an advantageous way, in one design the vehicle component may therefore also have an opening through which the environment detection sensor can be inserted into the recess. The opening may in this case be positioned in such a way that it is for example directed into an interior space of the vehicle and in the finished vehicle is covered by a further vehicle component, such as for example an interior paneling. This has the further advantage that the sensor is also subsequently still accessible with little effort.

In order that the calibrating effort is low, it is important to mount the sensor at a precisely positioned point in the vehicle component. To reduce the mounting tolerances, it is advantageous if a fastening element for fastening the environment detection sensor is also molded on the main body of the vehicle component or the covering portion. If the sensor has a corresponding counter element, high-precision mounting and positioning of the sensor in the component can be achieved in an easy way. Such a fastening element may be for example a latching or clipping element. The fastening element may be formed for example from the plastics material of the main body or the covering portion and is advantageously also formed directly during the production of the component, for example by a corresponding impression in the mold.

The vehicle component described above serves for integrating an environment information sensor. This is arranged in the recess of the vehicle component such that the signal passing-through area or the signal passing-through opening lies within the coverage of the sensor. The coverage refers here to the space in which the sensor can, by virtue of the way in which it is constructed, detect the environment by emitting and receiving signals. This arrangement allows the sensor to be visually concealed behind the covering portion and nevertheless send and receive signals through the signal passing-through area. If the covering portion has a signal passing-through opening, the sensor can reach into this signal passing-through opening and for example end flush with the covering portion. This makes very unobtrusive integration of the sensor in the vehicle component possible.

The environment detection sensor is preferably a lidar sensor. In principle, the use of other sensors is also contemplated, such as for example radar sensors or cameras, the choice of material and design of the signal passing-through area having to be adapted correspondingly. Lidar (light detection and ranging) is a method related to radar for optical distance and velocity measurement. A lidar sensor emits laser pulses and uses backscattered light for determining position and velocity. The lidar signals are in this case formed by diodes, filters and possibly deflecting elements and are radiated from the sensor.

In a preferred design, the signal passing-through area therefore represents a first transmission area for the signals emerging from the sensor. The signal passing-through area in this design assumes the further function of a protective covering of the sensor. The sensor can therefore be mounted in the vehicle component without a separate housing. As a result, the transmission area in the signal path of the sensor can be omitted, which increases the range of the signals and quality of the signal evaluation.

Further advantages, features and details of the invention are provided by the following description, in which exemplary embodiments of the invention are described in detail with reference to the drawings. The features mentioned in the claims and in the description may each be essential to the invention individually on their own or in any desired combination. Where the term "can" or "may" is used in this application, it relates both to the technical possibility and to the actual technical implementation.

Exemplary embodiments are explained below on the basis of the accompanying drawings.

BRIEF DESCRIPTION OF THE DRAWINGS

FIG. 1 shows a basic diagram of a vehicle component, given by way of example, in a perspective view.

FIG. 1 shows a vehicle component 1, given by way of example, for integrating an environment detection sensor 30.

DETAILED DESCRIPTION OF THE DRAWINGS

The vehicle component 1 comprises a main body 10. The main body 10 is formed in a skeleton type of construction. It has multiple bar-like structures 12 of plastic reinforced with continuous fibers, which are arranged appropriately for the load paths and are connected to one another by multiple plastic webs 14 to form a truss-like main body.

The component 1 shown represents by way of example a node for the attachment of an A pillar 2 and a roof frame 3. Still further components (not shown) may be connected to the vehicle component 1. For example, a roof may also be mounted on the upper side of the vehicle component 1.

The vehicle component 1 also has a covering portion 20. The covering portion 20 is formed from a plastic, such as for example (colored) polycarbonate. The covering portion 20 is preferably formed in one piece with the main body 10 and for example is molded on it. The covering portion 20 forms at least part of a visible side of the vehicle component 1, which is visible in the finished vehicle.

Formed in the main body 10 is a recess 16, which is formed in such a way that an environment detection sensor 30 can be received in it. An approximately cylindrical recess 16 is shown by way of example, but it may in principle also have any other form. The recess 16 is delimited on one side by the main body 10. Toward the visible side of the vehicle component 1, the recess 16 is also delimited by the covering portion 20.

Arranged in the recess 16 is an environment detection sensor 30, for example a lidar sensor. For mounting the sensor in the vehicle component 1, the recess 16 has an opening 18. In the drawing, this is shown on the underside of the vehicle component 1, but it may also be positioned at a different point. Through the opening 18, the environment detection sensor 30 is inserted into the recess 16 and positioned. The opening 18 may be covered later, for example by an interior paneling part.

The environment detection sensor 30 is preferably received completely in the main body 10 and at no point projects beyond the outer contour defined by the bar-like structure 12. The sensor may be fixed on the vehicle component 1 by a fastening element that is not shown and is for example also formed on the main body 10.

The environment detection sensor 30 has a coverage 32, in which it can emit and receive signals, represented by the dashed arrows in FIG. 1. In order to make detection of the environment possible with the environment detection sensor 30 integrated in the vehicle component 1, the covering portion 20 is formed at least in a partial portion as a signal passing-through area 22, i.e. is sufficiently transmissive to the signals of the environment detection sensor 30. The function of the signal passing-through area 22 may be realized for example by suitable choice of material for the covering portion 20 and adapted geometrical dimensions, such as for example the wall thickness in the region of the signal passing-through area 22. Alternatively, instead of the signal passing-through area 22, a signal passing-through opening could also be provided, i.e. the covering portion could have an opening on this area.

LIST OF DESIGNATIONS

1 Vehicle component
2 A pillar
3 Roof frame
10 Main body
12 Bar-like structure
14 Plastic webs
16 Recess
18 Opening
20 Covering portion
22 Signal passing-through area
30 Environment detection sensor
32 Coverage

What is claimed is:

1. A vehicle component for integrating an environment detection sensor into a vehicle, comprising:
  a plastic component having a main body with a recess for receiving the environment detection sensor, wherein
  the recess is delimited toward a visible side of the vehicle component by a covering portion which has a signal passing-through area or a signal passing-through opening, and
  the main body has a fiber-reinforced truss-like structure.

2. The vehicle component as claimed in patent claim 1, wherein
  the recess completely receives the environment detection sensor.

3. The vehicle component as claimed in claim 1, wherein the covering portion is in one piece with the main body.

4. The vehicle component as claimed in claim 1, wherein the covering portion is a colored plastics material.

5. The vehicle component as claimed in claim 1, wherein the covering portion has a reduced wall thickness in a region of the signal passing-through area.

6. The vehicle component as claimed in claim 1, wherein the vehicle component is a body component or a structural component of a motor vehicle.

7. The vehicle component as claimed in claim 1, wherein the vehicle component is a node in a vehicle body.

8. The vehicle component as claimed in claim 1, further comprising:
  an opening in the main body through which the environment detection sensor is insertable into the recess.

9. The vehicle component as claimed in claim 1, wherein the environment detection sensor is arranged in the recess, so that the signal passing-through area or the signal passing-through opening lies within a coverage area of the environment detection sensor.

10. The vehicle component as claimed in patent claim 9, wherein
  the environment detection sensor is a lidar sensor.

11. The vehicle component as claimed in patent claim 9, wherein
  the signal passing-through area represents a first transmission area for signals emerging from the environment detection sensor.

12. The vehicle component as claimed in claim 1, wherein the fiber-reinforced truss-like structure includes a plurality of fiber-reinforced bars.

13. The vehicle component as claimed in claim 12, wherein the recess is arranged between the plurality of fiber-reinforced bars.

\* \* \* \* \*